(12) United States Patent
Kamei et al.

(10) Patent No.: US 6,768,241 B2
(45) Date of Patent: Jul. 27, 2004

(54) ROTATING-ELECTRIC MACHINE

(75) Inventors: Koichiro Kamei, Tokyo (JP); Takehiro Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/328,013

(22) Filed: Dec. 26, 2002

(65) Prior Publication Data

US 2003/0193257 A1 Oct. 16, 2003

(30) Foreign Application Priority Data

Apr. 12, 2002 (JP) ......................................... 2002-110006

(51) Int. Cl.$^7$ ............................................... H02K 17/00
(52) U.S. Cl. ...................... 310/207; 310/179; 310/184
(58) Field of Search ........................... 310/207, 154.01, 310/140, 133, 131, 74, 70 R, 70 A, 179, 184

(56) References Cited

U.S. PATENT DOCUMENTS 4,550,280 A * 10/1985 Freise .......................... 318/701
4,862,027 A * 8/1989 Isozumi et al. ................ 310/99

OTHER PUBLICATIONS

Direct-Current Motor, Published by the institute of Electrical engineers of Japan Publication Date: Mar. 20, 1967, p92, 121~p93,11.

* cited by examiner

Primary Examiner—Thanh Lam

(74) Attorney, Agent, or Firm—Sughrue Mion, PLLC

(57) ABSTRACT

A rotating-electric machine for use in engine starter capable of improving power by reducing inductance of coil is provided. An armature 7 is provided inside a stator, and when an armature winding 2 is inserted into a slot 4 provided in the armature 7, the armature winding 2 is formed into a wave winding and a short-pitch winding. In case that number of poles 2p=6 and number of slots Ns=23, the armature winding 2 are inserted into 1st to 4th slots, and a back pitch yb is established to be 3, whereby a short-pitch degree $\delta(=|Ns/2p-yb|)$ is 0.83 and an expression of $0.5<\delta<1$ is satisfied.

6 Claims, 6 Drawing Sheets

ROTATING-ELECTRIC MACHINE

BACKGROUND OF THE INVENTION

1. Field of the Invention

The present invention relates to an armature winding of a rotating-electric machine for use in engine starter and the like.

2. Description of the Related Art

In a dc motor with brush according to a prior art, lap winding and wave winding have been employed as a method for winding an armature. In case of wave winding, it is required to satisfy the expression of $(k\pm 1)/p=$integer (where: k is number of segments, 2p is number of poles), and the armature winding becomes either short-pitch winding or long-pitch winding.

Generally, it has been said that short-pitch winding is favorable in view of rectification. However, if short-pitch degree $\delta(\delta=|Ns/2p-yb|)$, where: yb is a back pitch, Ns is number of slots) is set up to be excessively large, a commutating zone becomes broad, which is not favorable in view of rectification. Therefore, it is more preferable to select $\delta$ as small as possible.

FIG. 6 is a winding diagram of an armature winding according to a prior art. In the drawing, reference numeral 21 is a commutator segment, numeral 22 is an armature coil, numeral 23 is a tooth of the armature, and numeral 24 is a slot.

As shown in FIG. 6, for example, in case of 2p=6 and Ns=23, Ns/2p=3.83. For the above reason, when inserting the armature coils 22 into the slots number 1 to 5 and establishing a back pitch yb as 4, a long-pitch winding of $\delta=0.17$ is obtained.

Since the conventional rotating-electric machine is arranged as mentioned above, a problem exists in that when employing the long-pitch winding, inductance of the armature coil increases and output is reduced.

SUMMARY OF THE INVENTION

The present invention was made to solve the above-discussed problem, and has an object of providing a rotating-electric machine capable of improving output by reducing inductance of the coil.

A rotating-electric machine according to the invention includes an armature provided inside a stator, and an armature winding inserted into a slot provided in the armature, and in which the armature winding is formed into a wave winding and a short-pitch winding, and when putting short-pitch degree as $\delta$, an expression of $0.5<\delta<1$ is satisfied.

As a result of employing such an arrangement, inductance of a coil is reduced and output is improved.

Another rotating-electric machine according to the invention includes a stator composed of permanent magnet, an armature provided inside of the stator, and an armature winding inserted into a slot provided in the armature, and in which the armature winding is formed into a wave winding and a short-pitch winding, and when putting short-pitch degree as $\delta$, an expression of $0.5<\delta<1$ is satisfied.

As a result of employing such an arrangement, when a large current is applied to the armature winding, reduction in magnetic force of the permanent magnet of the stator due to armature reaction is difficult to occur.

DESCRIPTION OF THE PREFERRED EMBODIMENTS

Embodiment 1.

Generally, an engine starter includes a switching part for switching on/off a battery circuit interlocking with a key operation by a driver, a dc motor part for rectifying a direct current supplied from a battery through a brush and performing a rotating drive, and a mechanism part for delivering a torque of the motor to the engine. The invention is directed to the motor for use in such an engine starter.

Now, referring to the accompanying drawings, an embodiment of the invention is hereinafter described.

Figure 1:
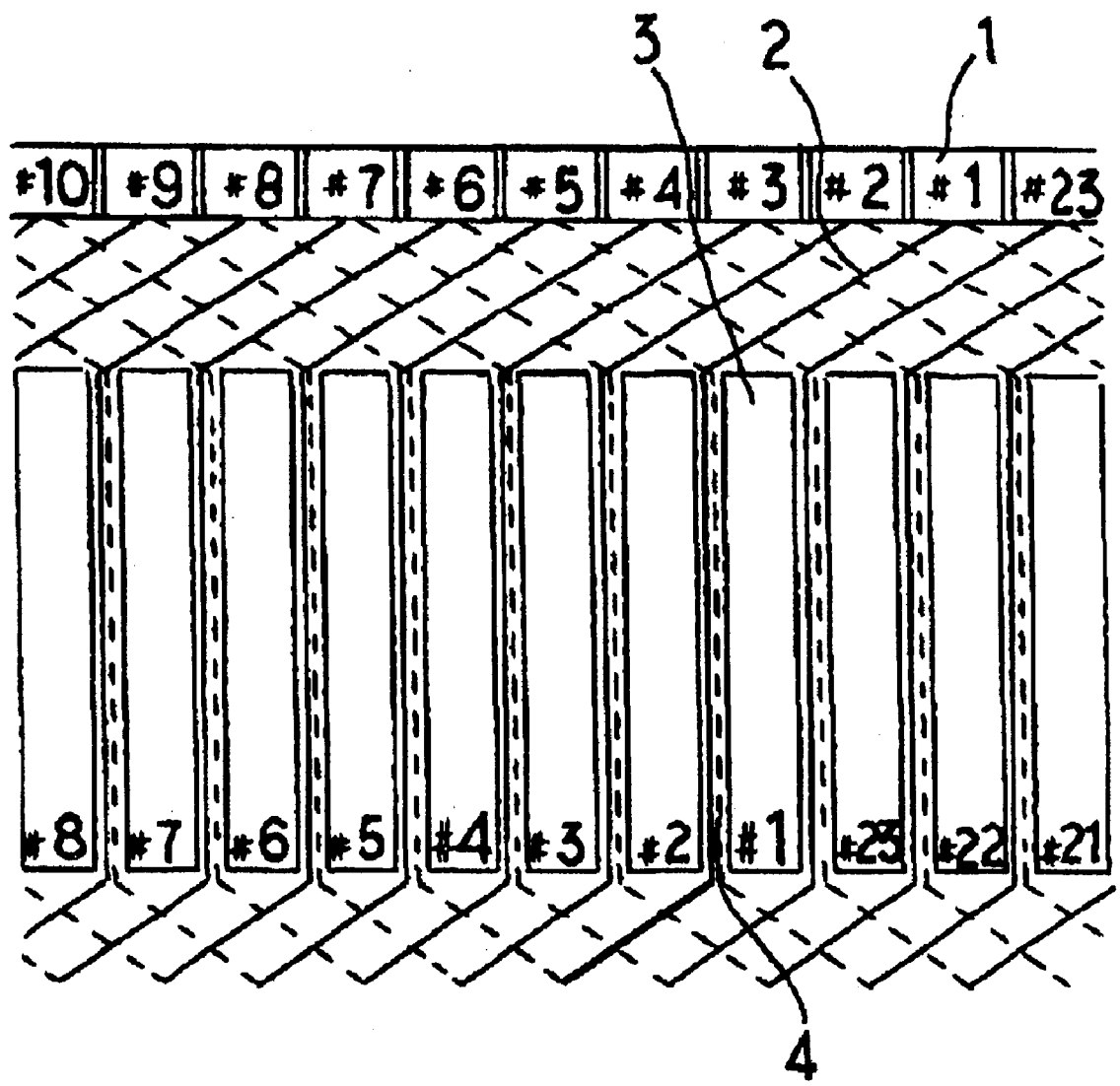
FIG. 1 is a winding diagram of an armature winding according to Embodiment 1 of the present invention.

FIG. 1 is a winding diagram of an armature winding according to Embodiment 1 of the invention, and in which reference numeral 1 is a commutator segment, numeral 2 is an armature coil, numeral 3 is a tooth in the armature, and numeral 4 is a slot.

It is herein supposed that 2p is number of poles, Ns is number of slots, yb is a back pitch and $\delta(=|Ns/2p-yb|)$ is a short-pitch degree.

In a motor of a starter for starting an engine, as shown in FIG. 1, for example, in case of wave winding in which 2p=6 and Ns=23, armature coil are inserted into 1st slot to 4th slot so as to satisfy the short-pitch degree $\delta$ to be $0.5<\delta<1$. Then, by establishing the back pitch yb to be 3, a short-pitch winding of $\delta=|23/6-3|=|3.83-3|=0.83$ is obtained.

Figure 2:
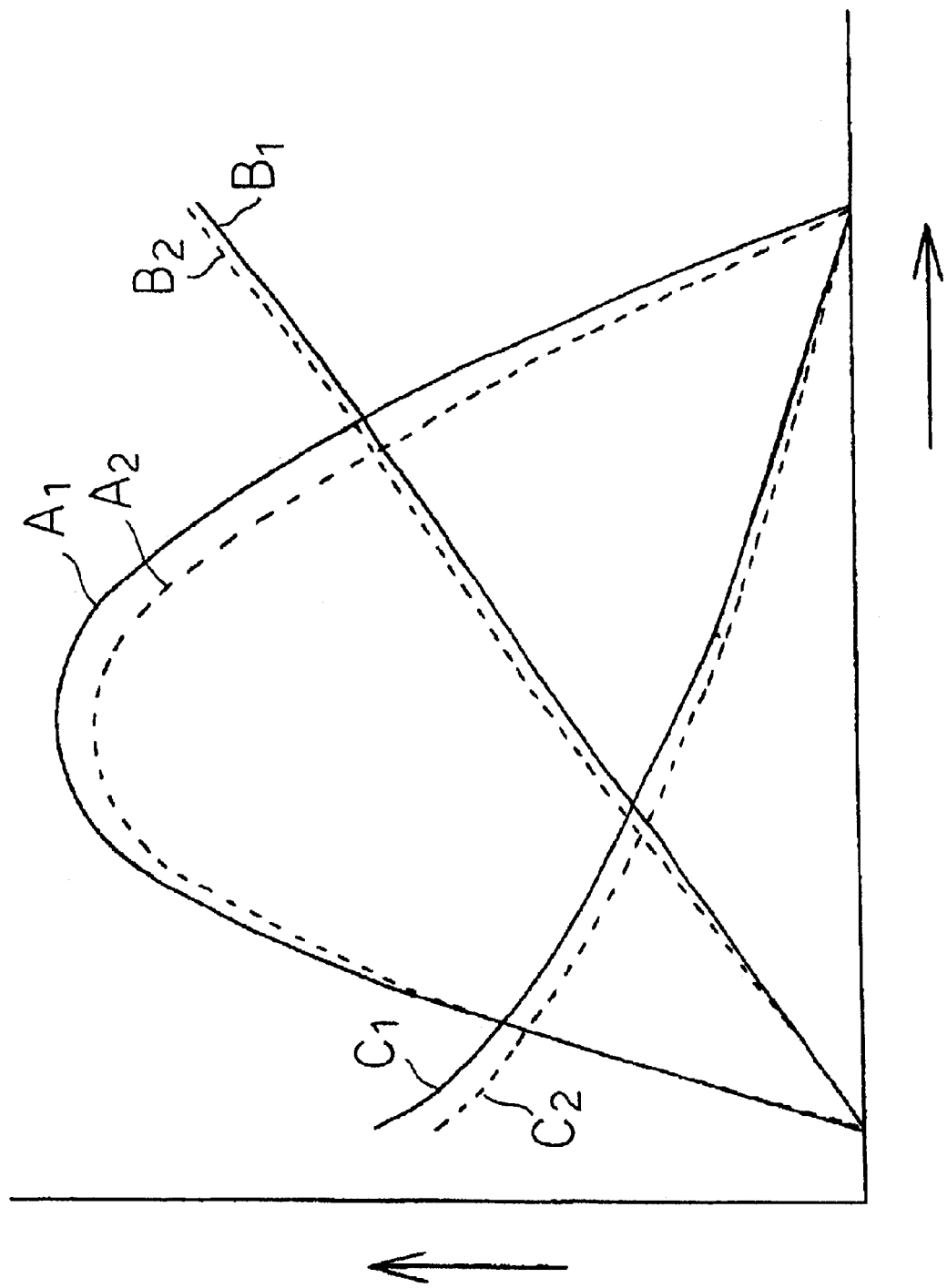
FIG. 2 is a graph showing relations between current and output, torque and rotating speed respectively.

FIG. 2 shows characteristic curves showing respectively relations between current and output, torque and rotary speed in comparison with the embodiment and the prior art, and in which solid lines represent characteristic curves in this embodiment, while dot lines represent characteristic curves in the prior art.

In FIG. 2 the horizontal axis represents a scale of current, and the vertical axis represents a scale of output, torque and rotary speed.

The solid line $A_1$ represents a characteristic curve of output in this embodiment, and the dot line $A_2$ represents a characteristic curve of output in the prior art.

The solid line $B_1$ represents a characteristic curve of torque in this embodiment, and the dot line $B_2$ represents a characteristic curve of torque in the prior art.

The solid line $C_1$ represents a characteristic curve of rotary speed in this embodiment, and the dot line $C_2$ represents a characteristic curve of rotary speed in the prior art.

As shown in FIG. 2, when increasing short-pitch degree, the commutating zone tends to increase thereby deteriorating rectification. When reducing number of effective coils excited under the main magnetic pole, torque tends to lower. Notwithstanding, output is improved because of reduction in mutual inductance of armature coil 2.

As a result of employing the short-pitch winding, the back pitch of the coil is reduced, and length of the coil end is shortened, which eventually results in a small sized motor.

Figure 3:
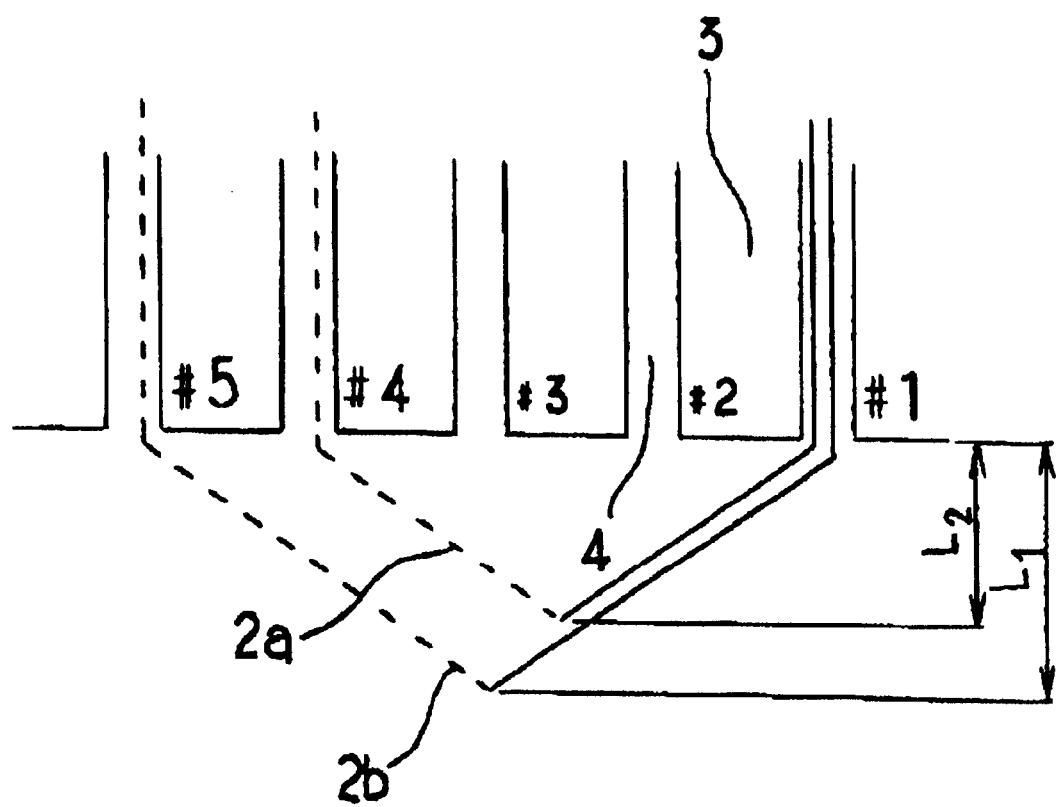
FIG. 3 is a plane view of a coil end portion.

FIG. 3 shows a plane view of a coil end portion. In the drawing, numeral 2a is an armature coil of the invention and 2b is an armature coil of the prior art. As shown in FIG. 3, assuming that the length of the end coil in the prior art is L1 and that of the end coil in this invention is L2, it is understood that L1>L2 and coil end length is smaller in the invention than in the prior art.

Embodiment 2.

Figure 4:
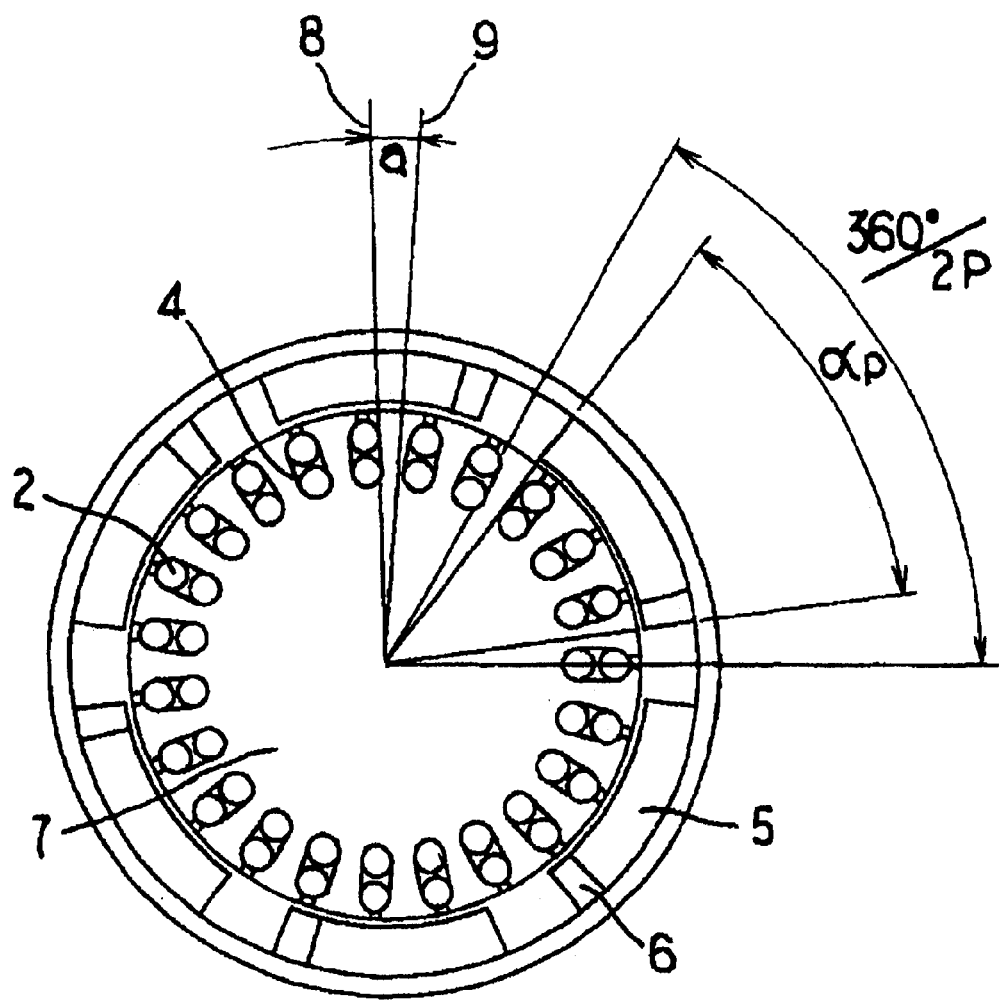
FIG. 4 is a front sectional view of a rotating-electric machine according to Embodiment 2 of the invention.

FIG. 4 is a front sectional view of the rotating-electric machine according to Embodiment 2 of the invention. In this embodiment, field of the stator is composed of a permanent magnet.

In the drawing, numeral 5 is the permanent magnet, numeral 6 is an auxiliary magnetic pole, and numeral 7 is an armature. Numeral 8 is a geometric neutral axis, numeral 9 is a brush position, and αp is an angle of magnetic pole (pole arc).

The angle of magnetic pole (pole arc) αp is set to be within a range of 70% to 78% of 360°/2p.

Further, the brush position 9 is set to be at a position turned by 4 to 7° from the geometric neutral axis 8 in opposite direction of turning the armature 7.

As a result of applying the armature winding to the permanent magnet starter as described above, number of effective coils excited under the main magnetic pole is reduced, and there is less influence due to armature reaction. Consequently, when a large current is applied to the armature winding, reduction in magnetic force due to armature reaction is difficult to occur.

Furthermore, as a result of setting the angle of magnetic pole (pole arc) αp to be within a range of 70% to 78% of 360°/2p and setting the brush 9 to be at a position turned by 4 to 7° from the geometric neutral axis 8 in opposite direction of turning the armature 7, deterioration in rectification is restrained and output is improved.

Embodiment 3.

As a method for improving rectification, resistance commutation utilizing brush resistance has been known. In this resistance commutation, when employing a brush of a large contact resistance, rectification is performed only with the assistance of a contact resistance of the brush, and substantially a linear rectification curve is obtained.

However, when increasing resistivity of the brush, motor power is reduced.

To cope with this problem, in this embodiment, a double-layer brush is employed. This double-layer brush is composed of a material containing a large amount of copper and having a small resistivity, and a material containing a small amount of copper and having a large resistivity.

Figure 5:
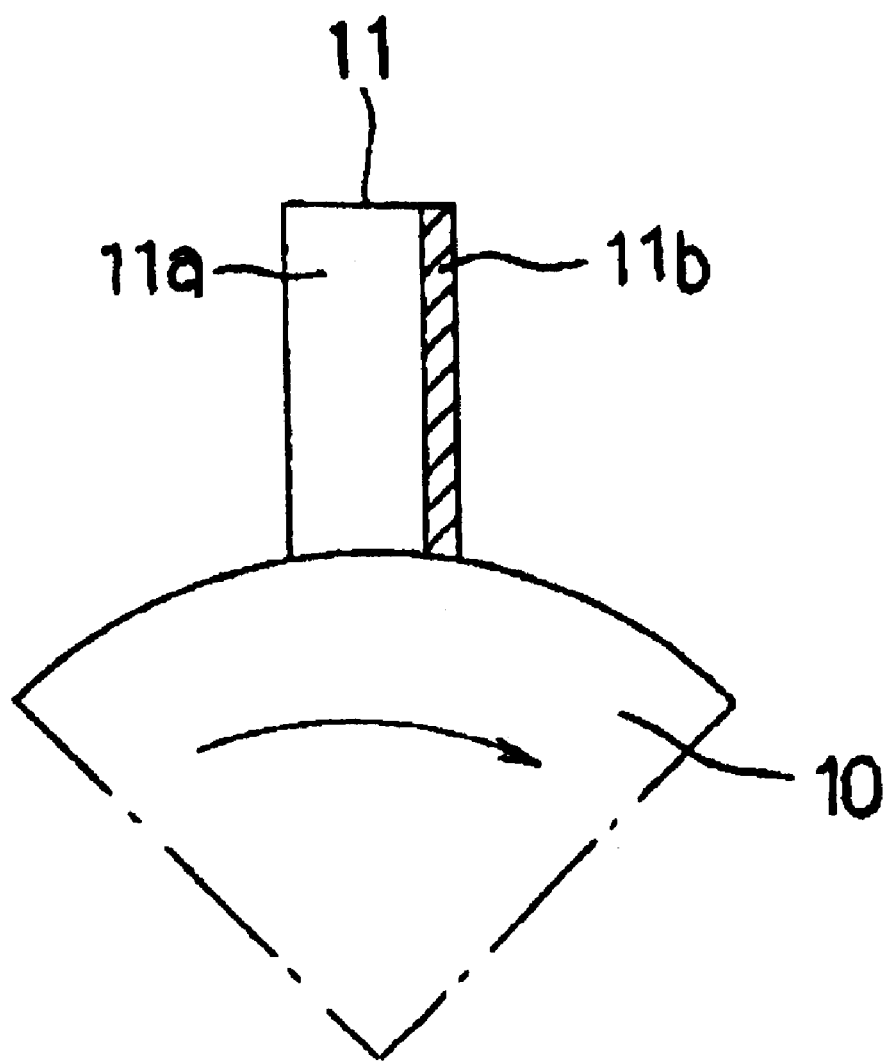
FIG. 5 is a front view of a brush portion of the rotating-electric machine according to Embodiment 3 of the invention.
Figure 6:
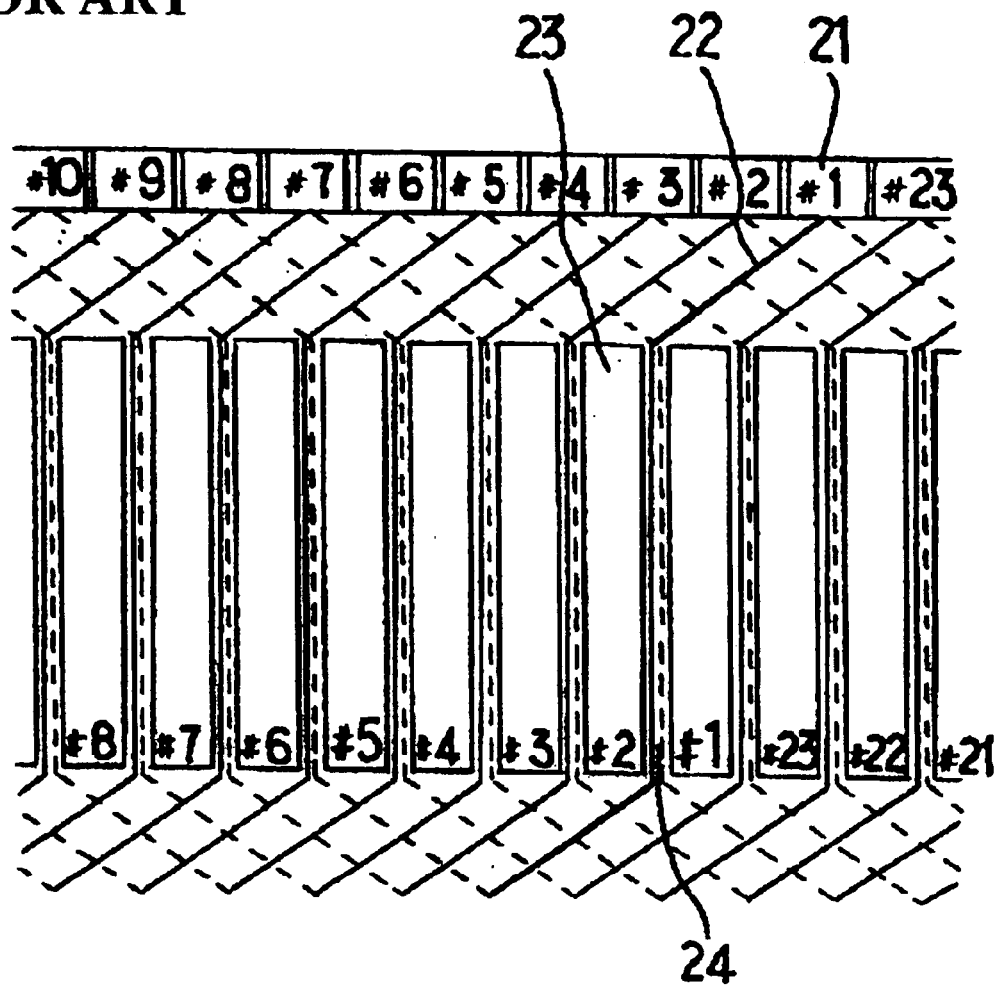
FIG. 6 is a winding diagram of an armature winding according to the prior art.

FIG. 5 is a front view of a brush portion of a rotating-electric machine according to Embodiment 3 of the invention. In the drawing, numeral 10 is a commutator, numeral 11 is a brush, 11a is a material containing a large amount of copper, and numeral 11b is a material containing a small amount of copper.

Thus, in combination of two materials of different resistivities with respect to the turning direction of the commutator 10, the double-layer brush 11 is obtained.

The double-layer brush combined with the armature can prevent deterioration in rectification without reduction in power.

Additional Features and Advantages of the Invention

As a further feature of the invention, the rotating-electric machine is provided with a commutator and a brush for performing rectification, and in which the brush is composed of a combination of materials of different resistivities with respect to a turning direction of the commutator.

Such an arrangement can prevent deterioration in rectification without reduction in power.

What is claimed is:

1. A rotating-electric machine comprising:

an armature provided inside a stator, and an armature winding inserted into a slot provided in said armature, wherein said armature winding is formed into a wave winding and a short-pitch winding, and wherein $0.5 < \delta < 1$, where $\delta$ is the short-pitch degree.

2. A rotating-electric machine comprising:

a stator composed of a permanent magnet, an armature provided inside said stator, and an armature winding inserted into slots provided in said armature, wherein said armature winding is formed into a wave winding and a short-pitch winding, and wherein $0.5 < \delta < 1$, where $\delta$ is the short-pitch degree.

3. The rotating-electric machine according to claim 2, further comprising a commutator and a brush for performing rectification, wherein the brush is composed of a combination of materials of different resistivities with respect to a turning direction of said commutator.

4. A machine comprising:

a stator composed of a magnet;

an armature provided inside said stator;

slots provided in said armature; and an armature winding inserted into said slots, wherein said armature winding has a short-pitch degree that is within a range from about 0.5 to 1.0.

5. The machine according to claim 4, further comprising a commutator and a brush that performs rectification, wherein the brush comprises a combination of materials of different resistivities with respect to a turning direction of said commutator.

6. The machine according to claim 4, wherein the short-pitch degree is calculated according to the following formula:

$$\delta = |N_s/2p - y_b|,$$

wherein $\delta$ is the short-pitch degree, Ns is the number of slots provided in said armature 2p is a number of poles, and yb is a back pitch.

* * * * *